United States Patent Office 2,866,815
Patented Dec. 30, 1958

2,866,815

PROCESS FOR THE PRODUCTION OF AROMATIC COMPOUNDS CONTAINING CARBOXYL GROUPS

Hubert Schirp, Dusseldorf, Germany, assignor to Henkel & Cie. G. m. b. H., Dusseldorf-Holthausen, Germany, a corporation of Germany No Drawing. Application July 2, 1957
Serial No. 669,439

Claims priority, application Germany July 4, 1956

10 Claims. (Cl. 260—515)

This invention relates to a process for producing aromatic carboxylic acids from salts of organic acids having a phosphorus atom attached to an aromatic nucleus.

It is an object of this invention to provide a simple process for obtaining aromatic carboxylic acids from benzene and phosphorous oxides or chlorides.

It is a further object of this invention to provide a process for producing aromatic carboxylic acids by heating salts of organic acids wherein a phosphorus atom is directly attached to an aromatic nucleus, such as in aromatic phosphonic or phosphonous acids.

These and other objects of this invention will become apparent as the description thereof proceeds.

I have found that the above objects may be accomplished by my process which comprises heating salts of those organic acids of phosphorus wherein the phosphorus atom is attached directly to an aromatic ring system to temperatures above 200° C. in the presence of carbon dioxide, which may also be present in combined form. Depending upon the reaction conditions and the starting materials, salts of aromatic mono- or polycarboxylic acids, such as benzoic acid or terephthalic acid, or of mixtures of such carboxylic acids, are obtained thereby. The free acids or their derivatives, such as their chlorides or esters, may be obtained from the salts in accordance with known methods.

The radicals of acids of phosphorus present in the starting materials are usually split off during the reaction in the form of salts of various phosphoric acids. In some cases, however, compounds are also formed which contain radicals of acids of phosphorus attached to an aromatic nucleus.

Organic acids of phosphorus which may be used as starting materials for the reaction of this invention are aromatic phosphonic acids and phosphonous acids (in accordance with the nomenclature given in the book "Organophosphorus Compounds" by G. M. Kosolapoff). That is, compounds in the molecule of which the phosphorous atom is attached directly to an aromatic ring system, for example, to a benzene, naphthalene, diphenyl or diphenyl-methane radical through a C–P-linkage. In addition to the radical of an acid of phosphorus, the aromatic ring system may also carry other substituents, such as alkyl radicals or halogen atoms, provided such substituents do not cause the decomposition of the molecule under the reaction conditions. Typical examples of compounds which may be used as starting materials for the process according to the invention are phenyl-phosphonic acid, tolyl-phosphonic acids, 4-ethoxy-phenyl-phosphonic acid, α- and β-naphthylene-phosphonic acid, diphenyl-phosphonic acids and phenyl-phosphonous acid. Furthermore, those compounds which contain two identical or different organic radicals attached to the phosphorus atom, such as methyl-phenyl-phosphonic acid may also be used as starting materials.

The above-mentioned organic acids of phosphorus are used for the process of this invention in the form of their salts, especially in the form of their alkali metal salts or alkaline earth metal salts. The use of the potassium salts has been found to be especially advantageous.

The above-mentioned starting materials are heated in the presence of carbon dioxide, which may, if desired, also be present in combined form. Thus, the salts of the above acids of phosphorus may be heated in the presence of carbonates, especially in the presence of alkali metal carbonates. Especially good yields are obtained when potassium carbonate is used. It is advantageous to heat the starting materials in the presence of gaseous carbon dioxide under pressure, whereby especially good yields are obtained in many cases by virtue of the high pressures developed. The carbon dioxide may also be diluted by inert gases, such as by nitrogen. Furthermore, it is advantageous to add to the reaction mixture carbonates, especially alkali metal carbonates, in those cases where the starting materials are heated in the presence of gaseous carbon dioxide.

The above-mentioned starting materials should be as anhydrous as possible. Furthermore, it is advantageous to carry out the reaction according to the invention in the absence of oxygen.

The reaction according to the present invention takes place at elevated temperatures, generally above 200° C.; the upper temperature limit is determined only by the decomposition temperature of the organic substances, which in most cases lies about 500° C. The optimum reaction temperature is different for the individual starting materials, but in most cases lies between 250° and 400° C.

It has further been found that the reaction is favorably influenced by the presence of a number of catalysts. Especially advantageous effects are exhibited by heavy metals and their compounds; for example, by metallic zinc, cadmium, lead, mercury, iron, bismuth or thallium. These metals may also be used in the form of their oxides or their salts formed with inorganic or organic acids. The presence of the metal radical rather than the form in which it is combined appears to give the catalytic effect.

In addition to the catalysts, inert filler materials, such as sand, finely divided carbon, kieselguhr, bentonite, powdered metal or metal shavings, and also inert salts, such as sodium sulfate, potassium sulfate, potassium phosphates, and the like, may be added to the reaction mixture. Such inert filler materials are added to the reaction mixture especially in those cases where the reaction mixture tends to cake. The addition of organic solvents or diluents, such as benzene, toluene, xylene or high-boiling point benzines, is sometimes also advantageous.

The reaction mixture may be worked up, for example, by dissolving the same in water and separating therefrom the undesirable components by filtration, in the presence of activated charcoal or other purifying agents if desired. The carboxylic acids formed by the reaction may be separated from the aqueous solution by acidification thereof. The acidification may be effected with hydrochloric acid, sulfuric acid or with other strong acids. It is often also advantageous to acidify the solution with carbon dioxide. This method makes it possible to separate the terephthalic acid in the form of the relatively insoluble acid potassium salt.

The process of this invention makes it possible to obtain aromatic carboxylic acids, such as benzoic acid or terephthalic acid, from organic acids of phosphorus, which may be obtained by relatively simple methods from aromatic compounds; for example, by reaction with $P_2O_5$ or with halides of phosphorus. In this manner it is possible to obtain aromatic carboxylic acid, for example, terephthalic acid or benzoic acid, from aromatic hydrocarbons, such as benzene, in a very simple fashion.

The following examples are set forth to enable persons skilled in the art to understand and practice my invention and are not intended to be limitative.

Example I

A mixture of 23.4 gm. of the dipotassium salt of phenyl-phosphonic acid, 13.8 gm. anhydrous potassium carbonate and 1.0 gm. cadmium fluoride was placed into an autoclave having a volume of about 0.2 liter. Thereafter, about 190 gm. liquid carbon dioxide were introduced into the autoclave. The contents of the autoclave were then heated for 10 hours at 300° C., whereby a pressure of 1780 atmospheres developed. The reaction product, which weighed 36.7 gm., was dissolved in hot water. The solution was then filtered and acidified with hydrochloric acid while still hot. 3.2 gm. terephthalic acid were precipitated and the precipitate was filtered off while still hot and thereafter dried.

Example II

A mixture of 23.4 gm. of the dipotassium salt of phenyl-phosphonic acid, 13.8 gm. potassium carbonate and 2.0 gm. mercuric chloride was placed into an autoclave having a volume of 0.2 liter. Thereafter, 180 gm. liquid carbon dioxide were introduced into the autoclave. The contents of the autoclave were then heated for 10 hours at 280° C., whereby a pressure of 1710 atmospheres developed. The reaction product was dissolved in hot water. The solution was filtered and then acidified with hydrochloric acid while still hot. The precipitated terephthalic acid was filtered off and dried. The yield was 2.0 gm.

Example III

A mixture of 23.4 gm. of the dispotassium salt of phenyl-phosphonic acid, 13.8 gm. potassium carbonate, 1.5 gm. cadmium fluoride and 180 gm. carbon dioxide was heated in an autoclave having a volume of 0.2 liter for 20 hours at 260° C., whereby a pressure of 1600 atmospheres developed. The reaction product, which weighed 40 gm., was dissolved in water. The solution was filtered and then acidified with hydrochloric acid. By crystallization and shaking of the mother liquor with ether, a total of 3.65 gm. benzoic acid were obtained. By extraction of the mother liquor for 6 hours with ether in a perforator, 2.55 gm. phenyl-phosphonic acid were recovered.

Example IV

A mixture of 35.1 gm. of the dipotassium salt of phenyl-phosphonic acid and 1.5 gm. cadmium fluoride was placed into an autoclave having a volume of 0.2 liter. 170 gm. liquid carbon dioxide were added thereto. The resulting mixture was then heated for 10 hours at 300° C., whereby a pressure of 1800 atmospheres developed. The reaction product, which weighed 31.0 gm., was dissolved in water. The solution was filtered, acidified with hydrochloric acid and then shaken with ether. After evaporating the ether, 4.1 gm. benzoic acid were obtained. By extraction of the mother liquor with ether for 6 hours, 3.45 gm. phenyl-phosphonic acid were recovered.

While I have set forth specific embodiments and preferred modes of practice of my invention, it will be understood that the invention is not limited thereby and that various modifications may be made without departing from the spirit of the disclosure and the scope of the following claims.

I claim:

1. A process for the production of aromatic mono- and dicarboxylic acids which comprises the steps of heating salts of organic acids wherein a phosphorus atom is directly attached to an aromatic ring system selected from the group consisting of aromatic phosphonic and phosphonous acids, in a substantially oxygen free, substantially anhydrous atmosphere of carbon dioxide, in the presence of an alkali metal carbonate, to a temperature of at least 200° C. but not higher than the temperature at which the starting materials and products will substantially decompose, and thereafter separating the aromatic acid products.

2. The process of claim 1 wherein elevated pressures of carbon dioxide are used.

3. A process for the production of aromatic mono- and dicarboxylic acids which comprises the steps of heating alkali metal salts of organic acids wherein a phosphorus atom is directly attached to an aromatic ring system selected from the group consisting of aromatic phosphonic and phosphonous acids, in a substantially oxygen free, substantially anhydrous atmosphere of carbon dioxide, in the presence of an alkali metal carbonate, to a temperature of at least 200° C. but not higher than the temperature at which the starting materials and products will substantially decompose, and thereafter separating the aromatic acid products.

4. The process of claim 3 wherein the alkali metal carbonate is potassium carbonate.

5. A process for the production of aromatic mono- and dicarboxylic acids which comprises the steps of heating alkali metal salts of organic acids wherein a phosphorus atom is directly attached to an aromatic ring system selected from the group consisting of aromatic phosphonic and phosphonous acids, in a substantially oxygen free, substantially anhydrous atmosphere of carbon dioxide, in the presence of an alkali metal carbonate and in the presence of a catalyst comprising a metal selected from the group consisting of zinc, cadmium, mercury, iron, lead, bismuth and thallium, to a temperature of at least 200° C. but not higher than the temperature at which the starting materials and products will substantially decompose, and thereafter separating the aromatic acid products.

6. A process for the production of aromatic mono- and dicarboxylic acids which comprises the steps of heating salts of organic acids wherein a phosphorus atom is directly attached to an aromatic ring system selected from the group consisting of aromatic phosphonic and phosphonous acids, in a substantially oxygen free, substantially anhydrous atmosphere of carbon dioxide, in the presence of an alkali metal carbonate and in the presence of a catalyst containing a metal radical selected from the group consisting of zinc, cadmium, mercury, iron, lead, bismuth and thallium, to a temperature of at least 200° C. but not higher than the temperature at which the starting materials and products will substantially decompose, and thereafter separating the aromatic acid products.

7. A process for the production of terephthalic acid which comprises the steps of heating alkali metal salts of organic acids wherein a phosphorus atom is directly attached to an aromatic ring system selected from the group consisting of aromatic phosphonic and phosphonous acids, in a substantially oxygen free, substantially anhydrous atmosphere of carbon dioxide, in the presence of alkali metal carbonate, at a temperature of at least 200° C. and not greater than the temperature at which the starting materials and products will substantially decompose, and thereafter separating the terephthalic acid.

8. A process for the production of terephthalic acid which comprises the steps of heating alkali metal salts of organic acids wherein a phosphorus atom is directly attached to an aromatic ring system selected from the group consisting of aromatic phosphonic and phosphonous acids, in a substantially oxygen free, substantially anhydrous atmosphere of carbon dioxide, in the presence of alkali metal carbonate and in the presence of a catalyst comprising a metal selected from the group consisting of zinc, cadmium, mercury, iron, lead, bismuth and thallium, at a temperature of at least 200° C. and not greater than the temperature at which the starting materials and products will substantially decompose, and thereafter separating the terephthalic acid.

9. A process for the production of benzoic acid which comprises the steps of heating alkali metal salts of organic acids wherein a phosphorus atom is directly attached to an aromatic ring system selected from the group consisting of aromatic phosphonic and phosphonous acids, in a substantially oxygen freee, substantially anhydrous atmosphere of carbon dioxide, in the presence of an alkali metal carbonate and in the presence of a catalyst containing a metal radical selected from the group consisting of zinc, cadmium, mercury, iron, lead, bismuth and thallium, at a temperature of at least 200° C. and not greater than the temperature at which the starting materials and products will substantially decompose, and thereafter separating the benzoic acid.

10. A process for the production of terephthalic acid which comprises the steps of heating the dipotassium salt of phenyl-phosphonic acid in a substantially oxygen free, substantially anhydrous atmosphere of carbon dioxide in the presence of an alkali metal carbonate to a temperature of at least 200° C. but not higher than the temperature at which the starting materials and products will substantially decompose and thereafter separating the terephthalic acid.

No references cited.